(12) United States Patent
Saharan et al.

(10) Patent No.: US 11,426,940 B2
(45) Date of Patent: Aug. 30, 2022

(54) OPTICAL POWDER SPREADABILITY SENSOR AND METHODS FOR POWDER-BASED ADDITIVE MANUFACTURING

(71) Applicant: EOS of North America, Inc., Novi, MI (US)

(72) Inventors: Ankit Saharan, Novi, MI (US); Erling Richard LaSalle, III, Novi, MI (US)

(73) Assignee: EOS of North America, Inc., Novi, MI (US)

( * ) Notice: Subject to any disclaimer, the term of this patent is extended or adjusted under 35 U.S.C. 154(b) by 453 days.

(21) Appl. No.: 16/148,302

(22) Filed: Oct. 1, 2018

(65) Prior Publication Data

US 2019/0105843 A1 Apr. 11, 2019

Related U.S. Application Data

(60) Provisional application No. 62/569,060, filed on Oct. 6, 2017.

(51) Int. Cl.

| | |
|---|---|
| *B29C 64/393* | (2017.01) |
| *B33Y 30/00* | (2015.01) |
| *B33Y 50/02* | (2015.01) |
| *B28B 17/00* | (2006.01) |
| *B29C 64/214* | (2017.01) |
| *B28B 1/00* | (2006.01) |
| *B22F 10/20* | (2021.01) |
| *B33Y 10/00* | (2015.01) |
| *B29C 64/153* | (2017.01) |
| *B22F 10/30* | (2021.01) |

(52) U.S. Cl.
CPC ............ *B29C 64/393* (2017.08); *B22F 10/20* (2021.01); *B28B 1/001* (2013.01); *B28B 17/0081* (2013.01); *B29C 64/214* (2017.08); *B33Y 30/00* (2014.12); *B33Y 50/02* (2014.12); *B22F 10/30* (2021.01); *B29C 64/153* (2017.08); *B33Y 10/00* (2014.12)

(58) Field of Classification Search
None
See application file for complete search history.

(56) References Cited

U.S. PATENT DOCUMENTS

| | | | | |
|---|---|---|---|---|
| 2015/0115490 A1* | 4/2015 | Reinarz | .................. | B33Y 50/02 264/40.1 |
| 2015/0367415 A1* | 12/2015 | Buller | .................... | B33Y 10/00 419/53 |
| 2017/0341183 A1* | 11/2017 | Buller | .................... | B29C 64/393 |
| 2018/0001567 A1* | 1/2018 | Juan | ..................... | B23K 26/342 |

* cited by examiner

*Primary Examiner* — Mohammad M Ameen
(74) *Attorney, Agent, or Firm* — Seyfarth Shaw LLP

(57) ABSTRACT

Disclosed is an apparatus for and method of determining spreading behavior of a powder material during an additive manufacturing process. The method deposits a powder mound, moves a spreader to distribute a layer of powder over a build supported on a build area, operates an energy source to cast intercept the powder mound in the path of the source and onto an optical sensor during displacement of the powder mound, and analyzes an output of the optical sensor to identify features relating to the spreading behavior of the powder.

7 Claims, 14 Drawing Sheets

OPTICAL POWDER SPREADABILITY SENSOR AND METHODS FOR POWDER-BASED ADDITIVE MANUFACTURING

TECHNICAL FIELD OF THE INVENTION

The present invention relates to the field of additive manufacturing, wherein successive layers of an object or workpiece are built up from a powder or other fluent medium according to previously determined successive so-called two-dimensional "slices" of the object or workpiece, and more particularly to a system and method for determining the spreadability of a powder layer being applied. The invention further describes a method of determining a spreading behavior of a powder material during an additive manufacturing process; a method of performing an additive manufacturing process; and an additive manufacturing apparatus.

BACKGROUND OF THE INVENTION

Additive prototyping or additive manufacturing (AM) techniques using a laser or other energy beam to melt, fuse, cure, sinter or otherwise solidify material to build an object or workpiece (hereafter simply referred to as an object) in a layer-wise manner are well known. In one standard approach, an energy beam, such as a laser beam, is caused to scan over a build area in accordance with controlling apparatus that is driven by software which recreates a layer or slice of an object being built up. Layers are consecutively solidified and joined, as by fusing, melting, sintering or the like. In one type of AM, powder is provided in a build area of a build chamber. The powder is smoothed into a substantially planar surface at the top of the build area. The laser is scanned over selected parts of that surface to form the desired "slice" of the object. Another layer of powder is then applied, typically being spread and smoothed by an applicator (sometimes referred to as a wiper, recoater, doctor blade) having a straightedge or the like, which pushes a deposited mound of powder across the build area and over the just-scanned slice. It is an intended result to yield a layer of powder which is of a consistent thickness across the build area one layer to the next.

The term "build" is generally used to refer to the item or part that is constructed by controlling a laser or other heat source to melt powder particles in a layer-wise manner.

The term "build procedure" is to be understood as the steps carried out to create a particular build using a particular type of material. A build procedure can involve essentially an entire sequence of control commands for a powder dispenser, a spreader assembly, a laser scanner assembly, and so forth for all levels of a build. The powder material is usually spread as an even layer over a surface of a build area, which is surrounded by a flat table or frame, of an additive manufacturing apparatus, using a spreader or recoater to move a deposited powder, i.e., a mound or deposit of powder or a "powder pile", from one end of the build area across the surface. A lower edge of the spreader maintains a slight clearance from the upper surface of the build area, so that a thin layer of powder is spread during each pass of the spreader. This step is carried out prior to each build layer. It is desirable to know how well the powder is actually being spread, as this might affect operating parameters for the additive manufacturing apparatus. That may include modifications in the powder material itself to achieved the desired result. One way of describing a powder is to measure its flowability, i.e. its tendency or ability to flow in an apparatus such as a powder dispenser. The flowability of a powder can be measured using a suitable apparatus such as a flow meter and will depend on various factors such as particle size, particle shape, particle packing density, powder material, amongst others. However, the spreading behavior or "spreadability" of a powder—i.e., how the powder behaves while being spread in a layer—is influenced by factors that are not necessarily related to what might otherwise be considered as the powder's flowability.

The spreadability of a powder in an additive manufacturing process is very critical since it has a great influence on the quality of a build. However, at present the spreadability of a powder is typically only expressed as a qualitative measure ("good", "satisfactory", "less than optimal") but not as a quantitative measure. Furthermore, even a powder that has been observed to have "good" spreadability in a certain build procedure may deliver unsatisfactory results when used for a different build procedure, even though all the factors mentioned above are the same for both build procedures.

US Patent Publication 2015/0158249 addresses measuring layer thickness in an attempting to get accurate parts in an additive manufacturing process. However, such prior art does not address the inherent powder quality that determines its spreadability, which in turn affects part quality manufactured by laser powder bed additive manufacturing systems, and this aspect is addressed by the invention of the present application. The Inventors are not aware of any current method to quantify, qualify or measure the spreadability of the powder layers, and the relevant AM industry currently relies largely on flowability measured using methods, like Hall flow and Carney flow methodologies, which have no significant correlation to spreadability of the powders being used.

Therefore, it is an object of the invention, amongst others, to provide a way of determining the spreadability of a powder material used in an additive manufacturing process.

SUMMARY OF THE DISCLOSURE

According to an aspect of the invention, a method of determining the spreading behavior of a powder material during an additive manufacturing process includes the steps of depositing a powder to be spread in an additive manufacturing apparatus; moving a spreader against the deposited powder, or pile, to distribute a layer of powder over the build area and over a build (object or workpiece) being supported on a movable build platform (elevator) of the additive manufacturing apparatus; operating an energy beam such as a light source to intercept the powder being moved, to thereby cast a shadow of the powder pile onto an optical sensor during displacement of the powder pile; and analyzing an output of the optical sensor to determine or quantify the spreading behavior of the powder.

In the context of the invention, the equivalent expressions "determining the spreading behavior of a powder" and "quantifying the spreading behavior of the powder" are to be understood to mean identifying or measuring one or more values or quantities that are associated with the powder when it is spread during an additive manufacturing process. The Inventors have seen that the spreading behavior of a powder depends to some extent on various factors in addition to the factors that affect flowability, for example the spreader type, the spreader speed, the powder layer thickness, the material of the table or substrate, the roughness of the table or substrate, among others. While these additional factors can usually be measured or otherwise determined, the Inventors have seen that these are insufficient to fully describe the spreading behaviour or "spread" of a powder. It is possible that even under identical conditions (same powder, same apparatus, same build sequence), a build can be completed to a satisfactory degree of quality in a first process, and may exhibit a different quality in a second process.

One advantage of the inventive method is that it provides a way of dealing with the often unpredictable behavior of an otherwise well-defined powder material during a build procedure. As explained above, a material such as a powder that is used in an additive manufacturing process can be well-defined by various known and measurable properties such as particle size, packing density, flowability, etc., but even the knowledge of all these properties cannot prevent defects developing in a build, and a powder that gives very favorable results for one type of build procedure may give less than satisfactory results for another type of build procedure, even under essentially identical operating conditions. The inventive method preferably collects information relating to a build procedure during a build using actual conditions and using a specific type of powder material, and can therefore quantify or determine spread or the spreading behavior of that powder material during that type of build procedure. Actual conditions could of course be in a test build.

As used in the context of the invention, the terms "powder" and "powder material" are to be understood to mean a material comprising small particles that can flow freely when not contained. Polymer, metal and ceramic powder materials, among others, are well known. Under ideal conditions, the diminishing shape of a powder pile would remain essentially well-defined as the powder pile is pushed across the table by the spreader. A powder used in an additive manufacturing process may have very fine grain size, and under certain conditions the grains may tend to form clumps when pushed by the spreader. The invention is based in part on the insight that certain factors can cause the powder particles in the powder pile to behave in various and differing manners in actual AM build procedures. For example, the friction between the powder and the upper build surface will be different than the friction between the powder and the rest of the frame. The behavior of the powder as it is pushed over the previously solidifying build may be different from the behavior of the powder as it is pushed over the rest of the build area. Furthermore, the upper surface(s) of the build may not be essentially flat as intended, but may exhibit erratic projections that arise from residual stresses that develop during the melting and subsequent cooling of the powder material. These irregularities or projections—even if they are very small—will also interact in unpredictable ways with the powder particles in the powder pile, resulting in erratic or random accumulations in the powder pile, and detracting from an optimal spreading behavior of the powder.

An uneven or "bumpy" surface of the powder deposit is in itself not a problem, instead the real problem is that an uneven powder distribution on the surface of the build may give rise to small cavities or pinholes in the build. The Inventors have noticed that an uneven or bumpy surface of the powder deposit is a reliable indicator of an uneven powder distribution on the surface of the build, and have realised that the problem of an uneven powder distribution on the surface of the build can be remedied by adjusting the operating parameters of the additive manufacturing apparatus in such a way as to obtain a well-defined or smooth powder pile. The Inventors have realised a well-behaved powder pile surface is associated with satisfactory powder distribution at the build level, and therefore if measures are taken to ensure that the shape of the powder pile is kept satisfactory, the quality of the build can also be ensured.

According to an aspect of the invention, the method of performing an additive manufacturing process comprises the steps of preparing an additive manufacturing apparatus for a build; carrying out the steps of the inventive method of determining the spreading behavior of the powder material; operating the additive manufacturing apparatus to carry out the build procedure; and adjusting operating parameters of the additive manufacturing apparatus on the basis of the determined spreading behavior.

The inventive method of performing an additive manufacturing process can be carried out without any significant additional effort while at the same time improving the quality of the build. The spreading behavior of the powder material can be determined during a new build procedure, or can have been determined in a previous calibration procedure for that type of build procedure. Equally, it can be determined by a stand-alone test system outside of the additive manufacturing apparatus in point.

According to another aspect of the invention, the additive manufacturing apparatus comprises at least a build platform arranged within a build area which itself is within a frame, a spreader to displace a powder deposit to distribute a layer of powder over the build area; an optical sensor arranged in line with an energy source such as a light source, which light source is arranged to illuminate one side of the powder deposit, with the intercepted light thereby resulting in a cast shadow of the powder pile onto the optical sensor as the powder pile is being distributed by the spreader; and an analysis unit adapted to analyze an output of the optical sensor to determine the spreading behavior of the powder.

The inventive additive manufacturing apparatus can in one form be arrived at by equipping an existing additive manufacturing apparatus with an optical sensor, a light source, and an analysis unit to receive the output of the optical sensor. Equally, a standalone test unit may be provided that comprises the relevant elements as described above for determining the spreading behavior of the powder.

The invention will be further understood through consideration of the following description of some presently preferred embodiments. Features of the embodiments may be combined as appropriate.

In the following, but without restricting the invention in any way, it may be assumed that the additive manufacturing process comprises a selective laser sintering process. The spreader or recoater can have any suitable shape or geometry and may be a blade, a doctor blade, a roller, a scraper or the like. etc., usually having a straight edge to ensure that the thickness of the powder layer is uniform. A powder pile is generally supplied from a dispenser as a charge or load of material deposited in front of the spreader. The terms "powder pile", "powder heap" and "powder mound" are synonyms and may be used interchangeably. Any suitable combination of energy or light source and optical sensor can be used. In a particularly preferred embodiment of the invention, the light source comprises one or more semiconductor light sources such as light-emitting diodes (LEDs) or vertical cavity surface-emitting lasers (VCSELs), or any suitable laser light source. Preferably, the light source is configured to illuminate as much as possible of the surface of the optical sensor. For example, the beam of light generated by a point light source may diverge to cover most or all of the sensor area. Alternatively, a rectangular or square array of light sources can be arranged to illuminate a correspondingly rectangular or square optical sensor.

Any suitable configuration of the light source and optical sensor is possible, as long as the light source is able to cast a shadow of the powder pile onto the optical sensor for any position of the spreader between its initial and final positions. Preferably, the light source and optical sensor are arranged at opposite ends of the spreader and are carried by the spreader assembly. In a further preferred embodiment of the invention, the optical sensor is arranged essentially directly adjacent to the spreader, since the powder pile is also always directly adjacent to the forward moving or front of the spreader.

In one preferred embodiment of the invention, the optical sensor output includes an electrical signal, preferably a voltage signal, and wherein the step of analyzing the optical sensor output comprises determining the smoothness of the optical sensor output. In the following, but without restricting the invention in any way, it may be assumed that the sensor output signal is a voltage. As the spreader moves across the table and the powder pile diminishes in volume, the optical sensor area is gradually exposed to the light beam, and the analysis unit can monitor or follow the progression of the slope of the voltage curve. The analysis unit can track the voltage of the optical sensor over distance or time. For example, the optical sensor may provide its output as an analog voltage signal, and the analysis unit may sample this analogue signal at a suitable sampling rate. For a known volume of a specific powder material being spread by a known spreader under ideal conditions, the voltage will increase progressively, following a well-defined curve until it reaches a maximum voltage level (when the optical sensor is completely exposed to the light source). The invention is based on the insight that, in a real-life additive manufacturing process in which that same powder material is spread by the same spreader in the same manner, the sensor output signal will not result in the ideal curve; instead the actual curve will differ to some extent from the ideal or expected curve.

In the inventive method, the extent to which the actual voltage curve departs from the ideal voltage curve is detected by sampling the voltage and computing the slope of the voltage curve. Preferably, the analysis unit computes the slope of the optical sensor voltage at closely-spaced intervals, so that the shape of the voltage curve can be very precisely followed. Significant departures from an expected slope can be indicative of an irregular powder pile shape.

The analysis unit may be realized in any suitable manner, using appropriate hardware and/or software modules. In a further preferred embodiment of the invention, the analysis unit comprises various units or modules for processing signals received from the output sensor. For example, it may comprise a data acquisition module, a low-pass filter. The spreadability of a particular powder during a particular build procedure may then be quantified by one or more values, for example as a feature set comprising one or more known values that are descriptive of that powder. For example, for a particular powder with known properties relating to its flowability that is to be used in a particular build procedure, the additive manufacturing apparatus may determine one or more of these values in a calibration step as described above, and may store that set of values in a memory along with the powder parameters and build process parameters to quantify the powder spreadability. This information may then be used to plan a scanning strategy for a subsequent generation of the build.

In an aspect of the inventive method, the shape or curve of the sensor output signal can be compared to a known or expected curve that has been determined previously, for example by applying a best-fit algorithm to the sensor output signal measured during a trial pass of the spreader for that powder. A single expected curve shape may apply during each pass of the spreader, i.e. for each build layer. Alternatively, a set of expected curve shapes may be provided, wherein each expected curve shape relates to a specific build layer.

Of course, the inventive method can be performed without any such expected curve shapes. Instead, for example, the analysis unit can simply track the development of the sensor voltage signal in the knowledge that it should progressively increase as more and more of the sensor area is exposed. For such a voltage curve, the slope should always be positive. Any departure from this expected behavior can be interpreted as poor behavior of the powder in the powder pile, and that remedial action should be taken.

In a preferred embodiment of the invention, the knowledge gained from examining the slope of the sensor voltage is used to improve the quality of the additive manufacturing process, for example it makes it possible to better qualify powders that can be used in certain AM processes. To this end, the inventive method preferably comprises a step of iteratively adjusting operating parameters of the additive manufacturing apparatus to optimize the smoothness of the optical sensor output, i.e. to optimize the smoothness of the powder pile contour or shape. This may lead to optimization of the powder specification, for instance. For example, when the analysis unit has detected a significant departure from the expected slope, it can inform the controller of the additive manufacturing apparatus, which can respond by adjusting the operating parameters of the spreader, for example to adjust the velocity of the spreader and/or to add a slight vibration or oscillation to its lateral motion. Alternatively or in addition, the controller may cause the build platform to vibrate slightly. Such a slight vibration of will be transferred to the powder pile, and the powder particles can be helped to settle in a more controlled manner If the operating parameter adjustment was successful, the powder pile surface will become smoother, the sensor output voltage will be smooth, and this will be "seen" by the analysis unit.

In one preferred embodiment of the invention, any successful adjustment of operating parameters can be recorded, so that for the next layer of the same build, the controller of the additive manufacturing apparatus will be able to ensure that the powder material behaves in an optimal manner Similarly, a successful adjustment of operating parameters can be recorded to ensure that the powder material behaves in an optimal manner for all future layers of a separate build. To this end, the inventive method comprises a step of recording or storing the operating parameters of the additive manufacturing apparatus after completion of the iterative adjusting step. The operating parameters may relate to the spreader, the powder distributor, the build platform, etc. and may be recorded in conjunction with data describing the powder material used and any relevant parameters of that build, such as minimum wall thickness.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

As noted, the present disclosure has found particular application in the production of objects, or workpieces, in an additive manufacture process which utilizes a radiant beam of energy, such as a laser, to solidify a fluent material, such as a powder, in a layer-wise build-up of the object. In a typical process of this type, a layer of powder is spread and smoothed over the top plane or surface of a build area in which the object is being generated. Each layer corresponds with a two-dimensional "slice" of the object, which is then solidified (e.g., fused, melted, sintered) from the powder. The object is built up by moving the solidified layer(s) incrementally downwardly in the build chamber, and a fresh layer of powder then being spread by a recoater (sometimes also referred to as a doctor blade, applicator, slide, refreshing device, roller and other names), which takes a charge or load of material deposited in front of the recoater and then moves that material across the build area to form the fresh or new layer. This procedure repeats until the object is completed.

Figure 1:
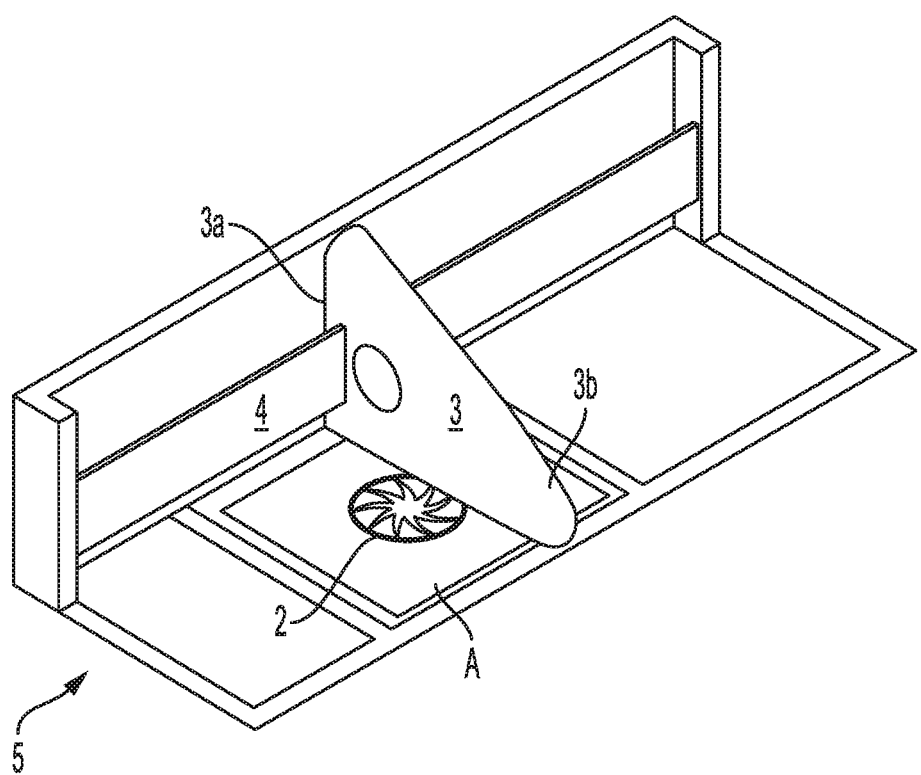
FIG. 1 is a perspective illustration of a recoater device as it would be located and moved over a build area of a typical additive manufacture apparatus.

FIG. 1 essentially shows a simplified view of an installation of the foregoing paragraph. There is a build area 1 which is part of a building chamber 5, with an object 2 being built therein. A typical recoating arm 3 which moves on a guide 4 to go back and forth across the build area 1. Here, the arm 3 has an end 3a that traverses on the guide 4 and an opposite end 3b which can be free. Details of such an arrangement can be further gleaned from US Publication 2015/0115490, the contents of which are incorporated herein as if fully set forth. Patents describing the general additive manufacture process referenced herein are legion, but reference can be made to U.S. Pat. Nos. 7,850,885, 7,820,241 and similar patents assigned to EOS GmbH Electro Optical Systems, for details thereof.

Figure 2:
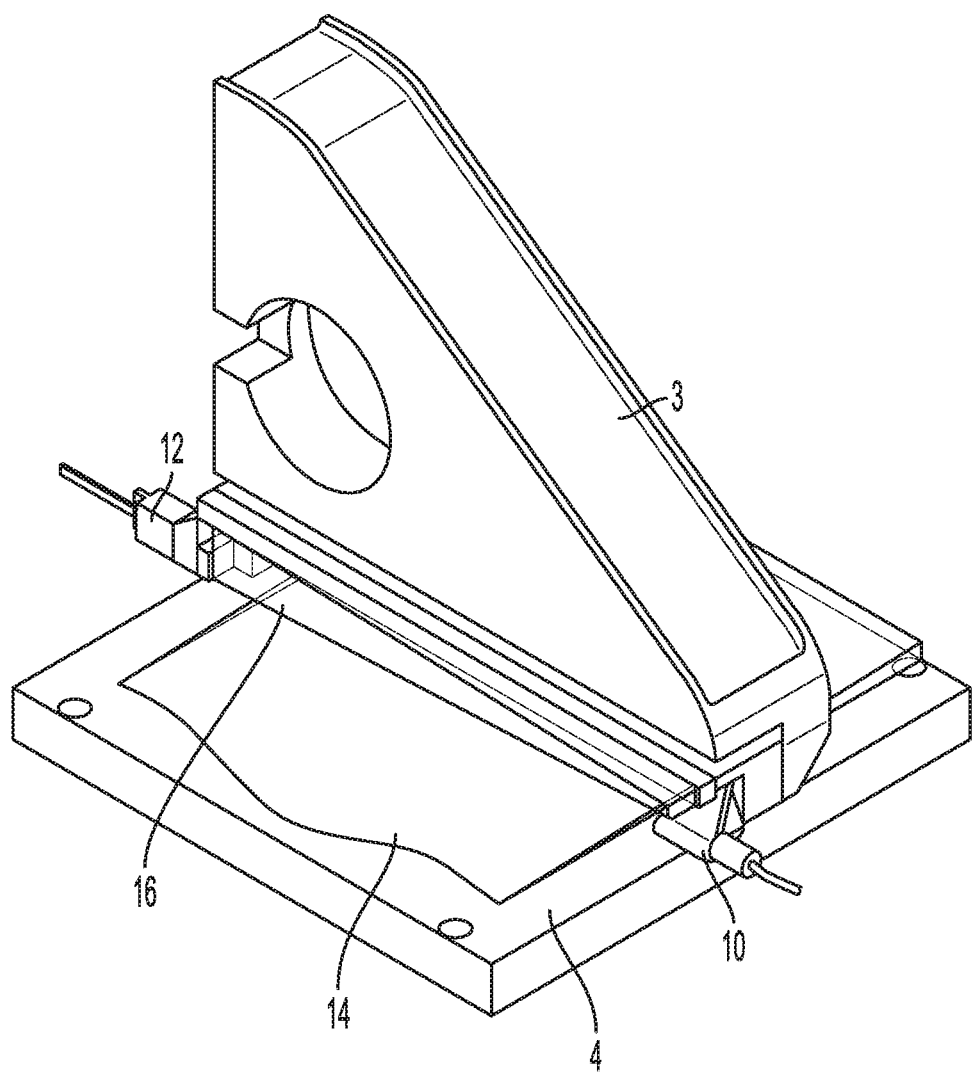
FIG. 2 shows a recoater device in perspective view modified to include a sensor array in accordance with an aspect of the present invention.

Turning now to FIG. 2, recoater arm 3 has been modified to include a sensor array generally including a source for an energy beam, here a laser source 10 mounted on one end of the recoater arm 3 and a detector 12 for that beam spaced from and on the other end of the recoater arm. "End" is simply for reference, with the source 10 and detector merely being spaced apart sufficiently to cover a desired distance over the build area 1, e.g., spanning the entire build area. The energy beam could be of many types, such as another kind of light beam or equivalent, but of a quality that the material being spread will be capable of blocking the beam, in whole or in part, in the application of material to the build area, as will be more fully revealed as follows. As illustrated in this embodiment, the sensor array 10, 12 is mounted to the bottom of one side of the recoater arm. Material, e.g., powder, which is to form a layer 14, is deposited in a known manner on one side of the build area 1, and is then pushed or swept across the surface of the build area by the lower extremity of the recoater arm, which may terminate in a blade or straightedge, although sometimes a roller is employed to the same end. The desired intent is to quantify the spreadability of the layer being deposited.

For the sensor array 10,12, a laser source made by Sensoparts' FL 70 Fiber optical amp with analog output was connected to Sensoparts' 33 LZ/1 a axial fiber optic cable with metal sheath to transmit the laser beam. The light of a red laser diode is spread out by a lens to a 1 mm radial light beam that is aimed at the receiving sensor unit. In the receiving sensor, the light is guided via various appropriate filters and lenses as known to those in the art, through a precision shutter to a light-sensitive detector.

The amount of occurring light is provided by analog electronics and output as an analog signal. The corresponding optical sensor 12 utilized in this embodiment uses the same type of fiber optic cable used to transmit the laser (33 LZ/1 fiber optic cable) to collect the laser light beam and transmit the light back to the FL 70 Fiber optical amp which outputs an analog voltage. As can be seen in the illustrations, the laser beam formed has a generally circular cross-section with a slight spread across the distance from source 10 to detector 12. The energy (light) impinging on the detector 12 generates an electrical signal of strength of the beam, which is processed by an Omega 8-Channel Voltage Input USB Data Acquisition Module (OM-USB-1208FS) to collect the analog voltage signal transmitted by wire from the FL 70 fiber optic amp. The USB DAQ collects 10,000 samples a second. The data collected from the USB DAQ is then processed using a computer program. Changes in the strength of the beam 16, as by the beam being blocked in degree, are then correlated to the amount of powder advancing before the recoater arm 3, and thus a measure of the thickness (or height) of the powder in front of the advancing wave of powder.

The processing algorithm used takes data from a sequence of measurements of a voltage read from the sensor and the time of each reading. This data is loaded into computer memory and low-pass filtered using, for example, a "box" filter algorithm. The width of the filter (number of data points used to calculate each filtered point) is adjustable as necessary. The "Lead In Minimum Pts" which are adjustable, are initial data points and used to calculate the average voltage signal at the start of the run ("Lead In Average").

The "Lead Out Minimum Pts" which are adjustable, are final data points that are used to calculate the average voltage signal at the end of the run ("Lead Out Average").

The "Lead In Length" is the total number of points at the start of the data before the portion of the data where the voltage transitions from approximately the "Lead In Average" to the "Lead Out Average". It is established by scanning the filtered data from the beginning toward the end until discovering the first point with a voltage greater than the "Start Level", which is "Lead In Average" plus an adjustment that is proportional [adjustable] to the difference between the two averages.

The "Lead Out Length" is the total number of points at the end of the data after the portion of the data where the voltage transitions from approximately the "Lead In Average" to the "Lead Out Average". It is established by scanning the filtered data from the end toward the beginning until discovering the first point with a voltage less than the "End Level", which is "Lead Out Average" minus an adjustment that is proportional [adjustable] to the difference between the two averages.

The set of points between the "Lead In Length" and the "Lead Out Length" are the points of interest. A least squares fit algorithm is applied to these unfiltered data points to determine a model for rate of voltage change over time. This is the primary calculated result of interest. The Standard Deviation, and Coefficient of Determination, for the fit are calculated as well.

Figure 15:
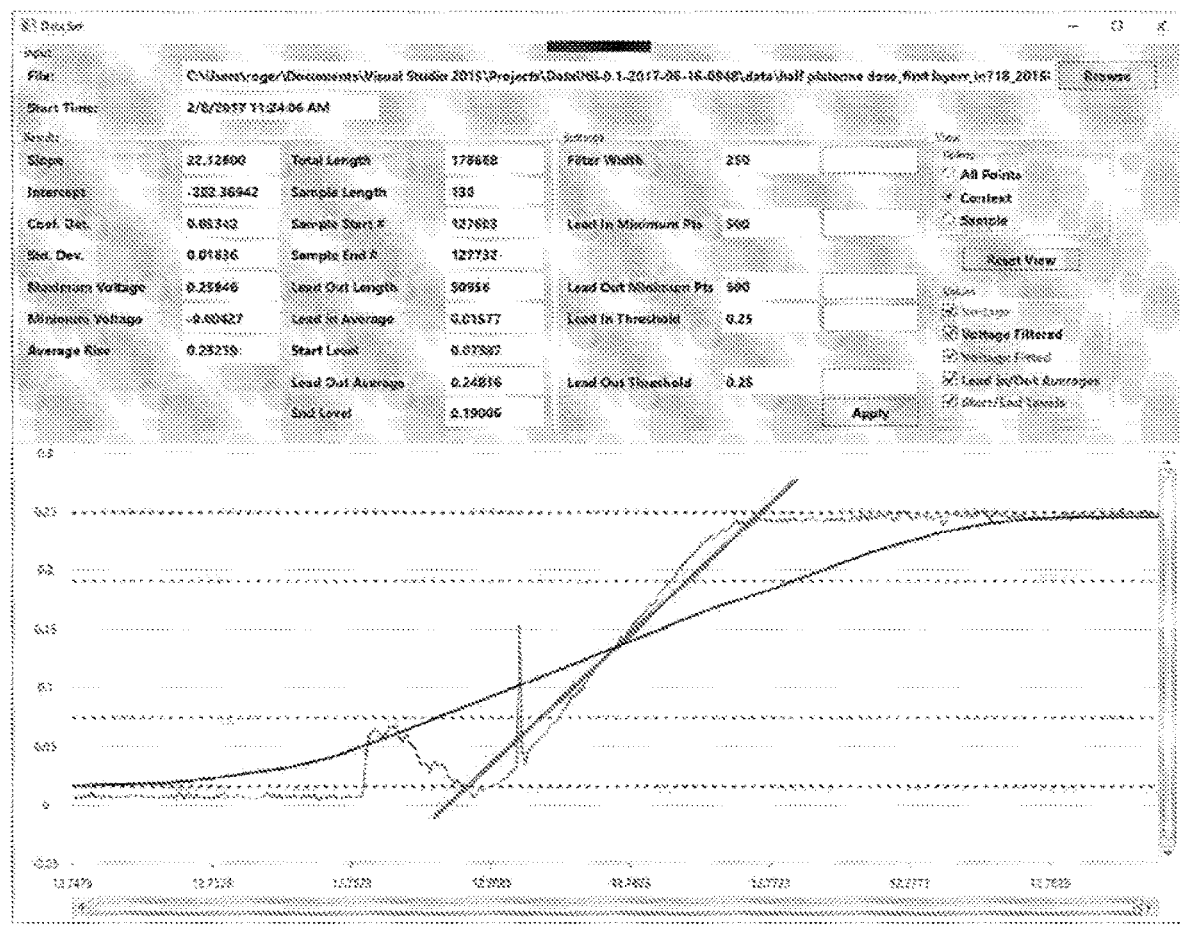
FIG. 15 shows a graph of rate of voltage change over time.
Figure 16:
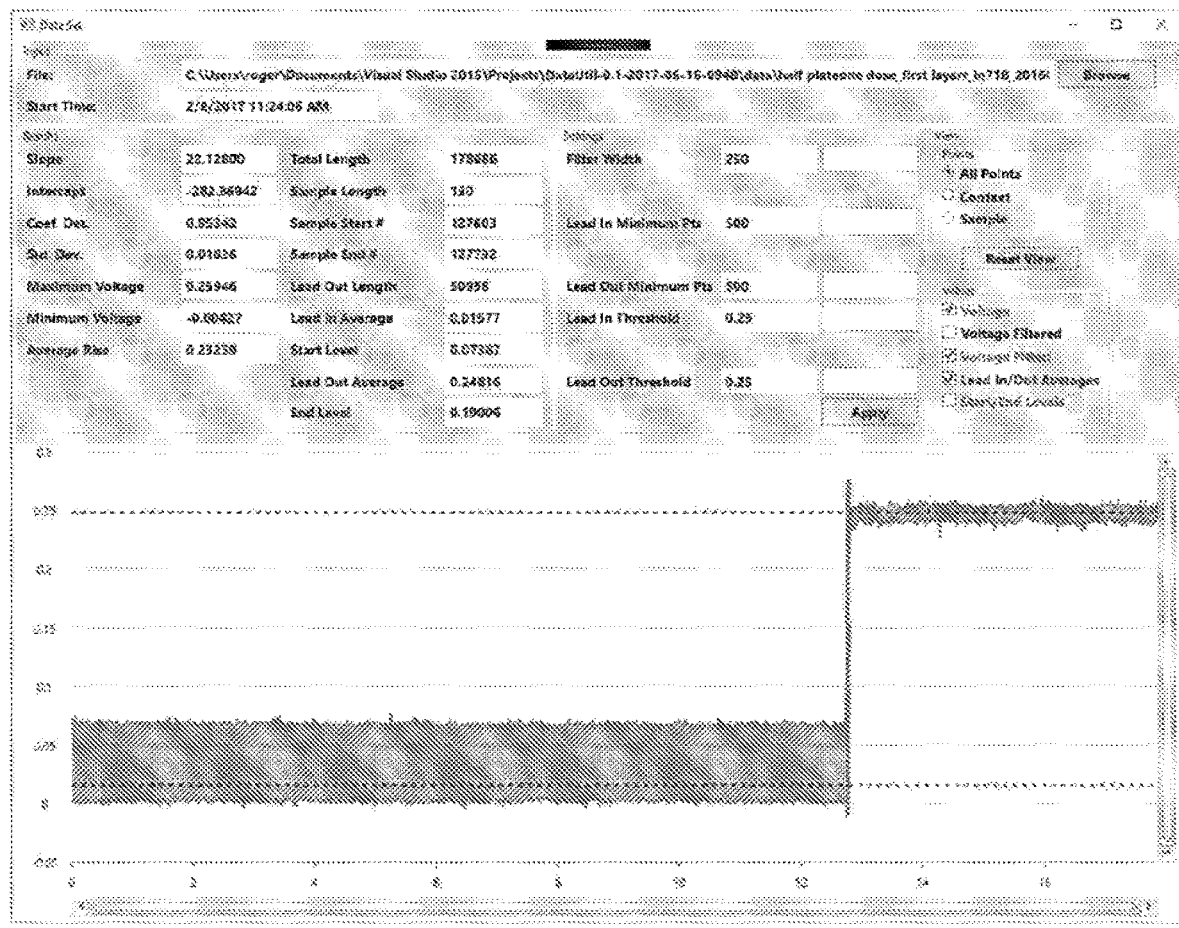
FIG. 16 shows a graph of rate of voltage change over time for a larger data set.

The graph of FIG. 15 shows an exemplary data set that has been analyzed. The graph in the lower portion of the user interface has several lines. One line shows the linear regression to the relevant portion of the data (calculated as a least-squares fit). It matches the "Slope" and "Intercept" values in the "Results" section. Another line is the unfiltered data that are the voltages read from the optical sensor. The yet another line is the data that has been subjected to a low-pass filter (to remove the higher frequency noise from the voltage signal). The width of the filter is 250 in this case. The first dotted lines show the average voltages of the initial 500 and final 500 points of the data. The second dotted lines show the adjusted voltage levels used to select the relevant sample that will be used for calculating the best fit. Similarly, FIG. 16 illustrates a chart of the entire data set, not just the region around the fitted sample. Note that the X axis includes different ranges than in FIG. 15.

Figure 3:
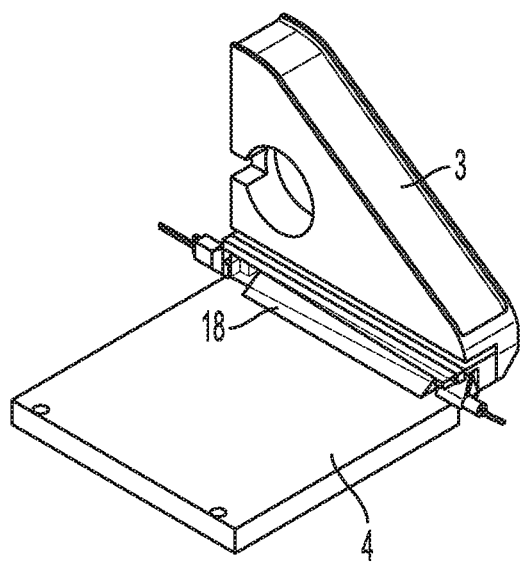
FIG. 3 shows the assembly of FIG. 2 at the beginning of application of a layer of powder.
Figure 4:
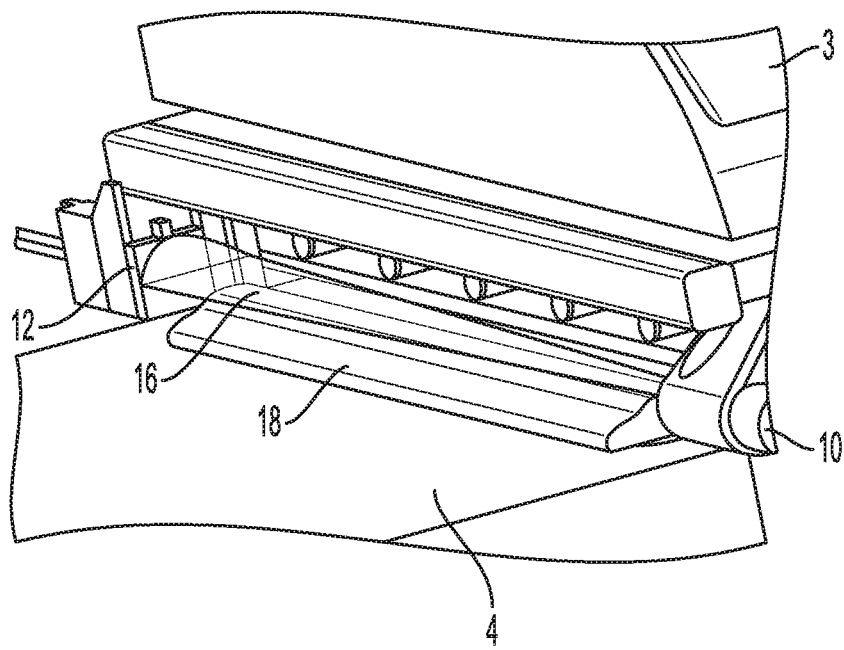
FIG. 4 illustrates the powder layer being pushed by the assembly of FIG. 3.

Looking now at FIGS. 3-7 in particular, FIG. 3 shows the recoater arm 3 at the approximate beginning of spreading a layer of powder 18 which has been placed in a charge in front of the advancing recoater arm 3. FIG. 4 illustrates that the laser beam 16 is blocked by the height of the powder 18, thereby resulting in less energy impinging on the detector 12, and therefore a reduced signal (voltage detected here).

Figure 5:
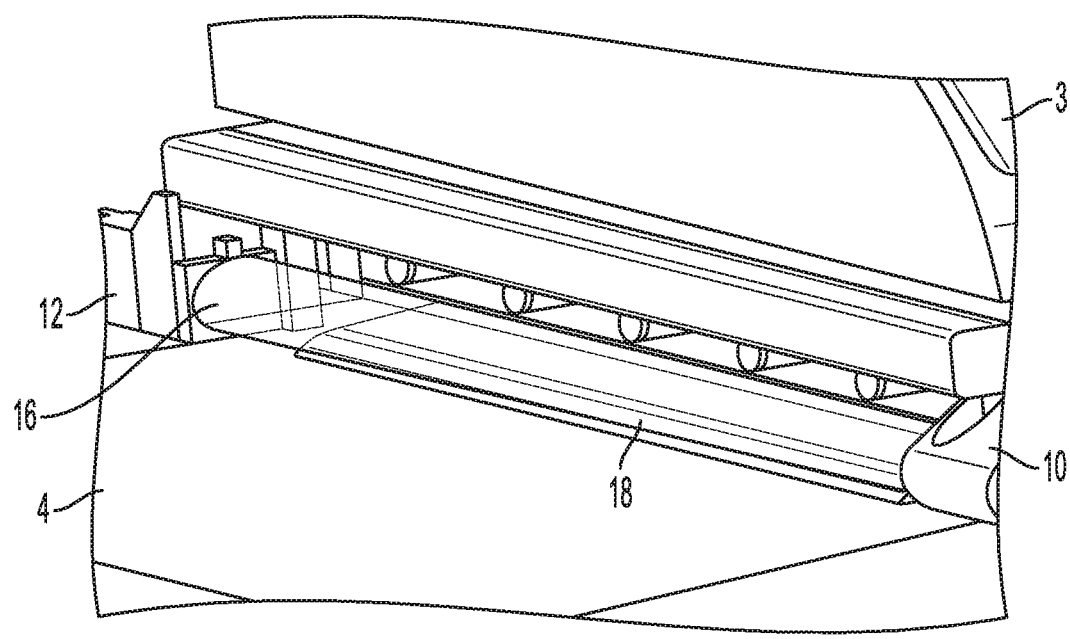
FIG. 5 illustrates the powder layer of FIG. 4 during further movement in application of the layer.
Figure 6:
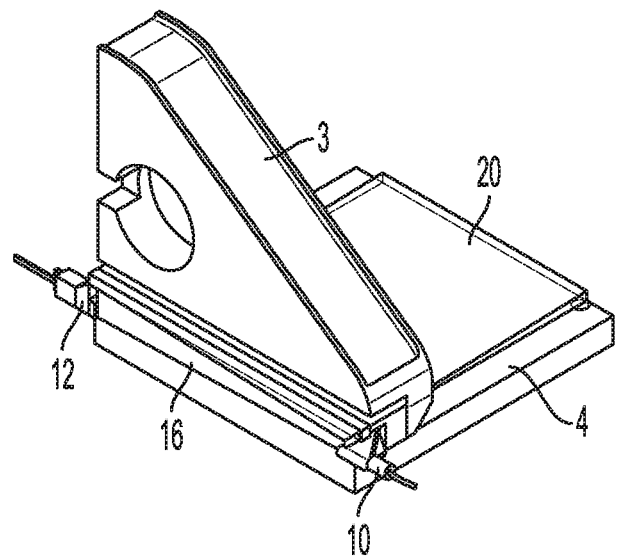
FIGS. 6 and 7 illustrate how a beam of a sensor array would appear (schematically) at the end of layer application.

In FIG. 5, we now see that as the powder 18 is being spread across the build area 1, the height of the powder wave (i.e., the powder being pushed) decreases with distance covered by the recoating operation. The signal voltage being detected thus increases as less of the beam 16 is being blocked by the height of the powder. FIG. 6 is intended to show the completion of the powder layer 20, with the recoater arm 3 essentially at the conclusion of its travel across the build area 1. At this stage in the process, no material is basically blocking the beam 16, and FIG. 7 is illustrative of this.

Figure 7:
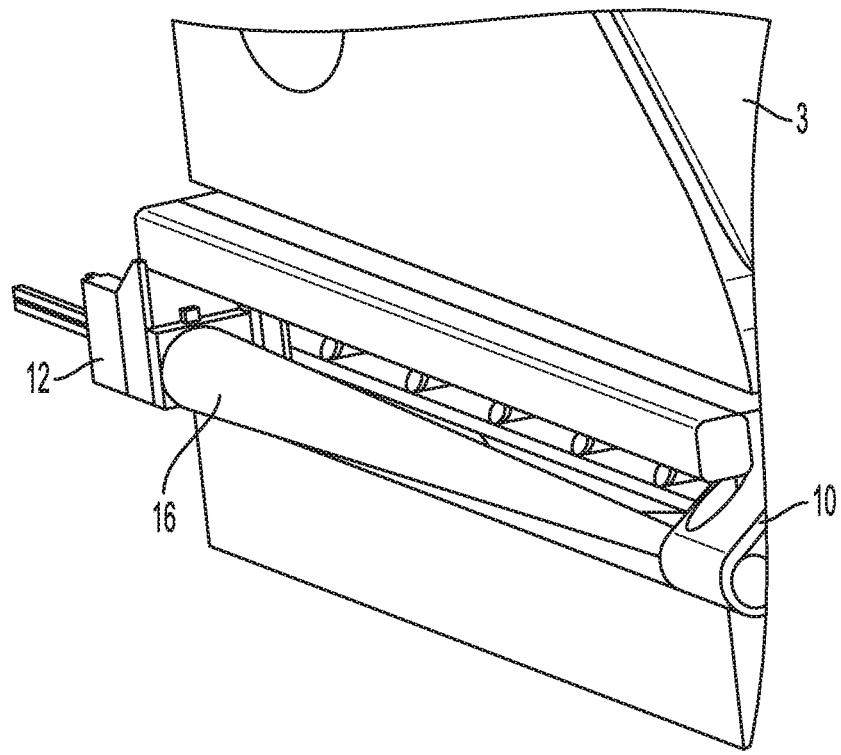
Figure 8A:
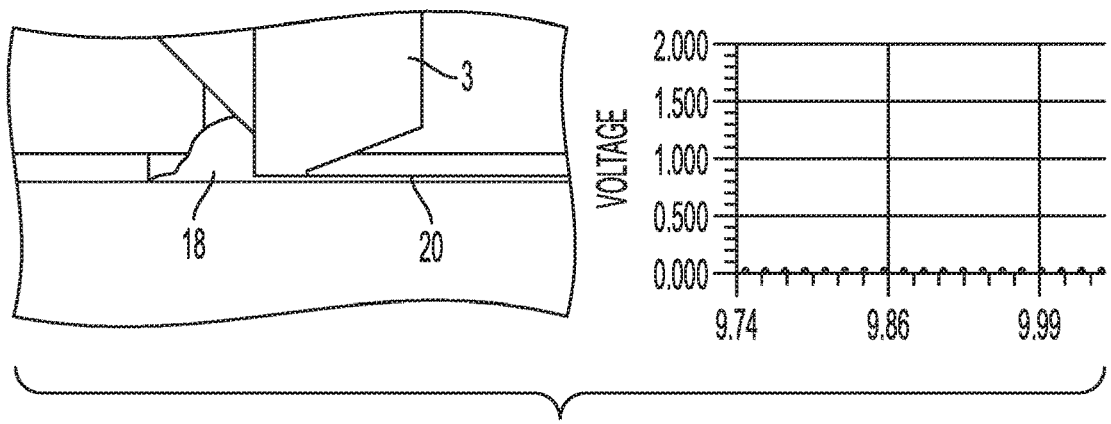
FIGS. 8 A-C show schematically on the left hand side how a layer of material could interact with the sensor array looking across (orthogonally) the path of the spreader, and on the right hand side what a correlated signal trace could be produced thereby.
Figure 8B:
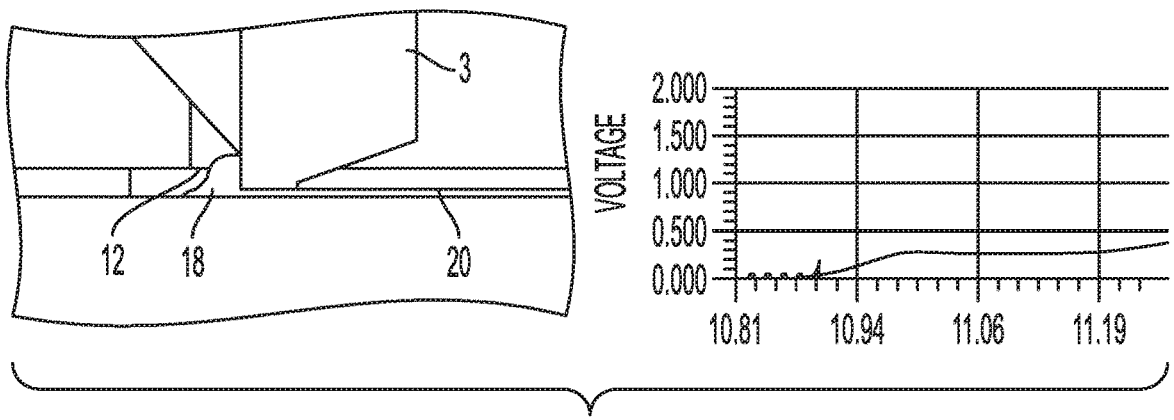
Figure 8C:
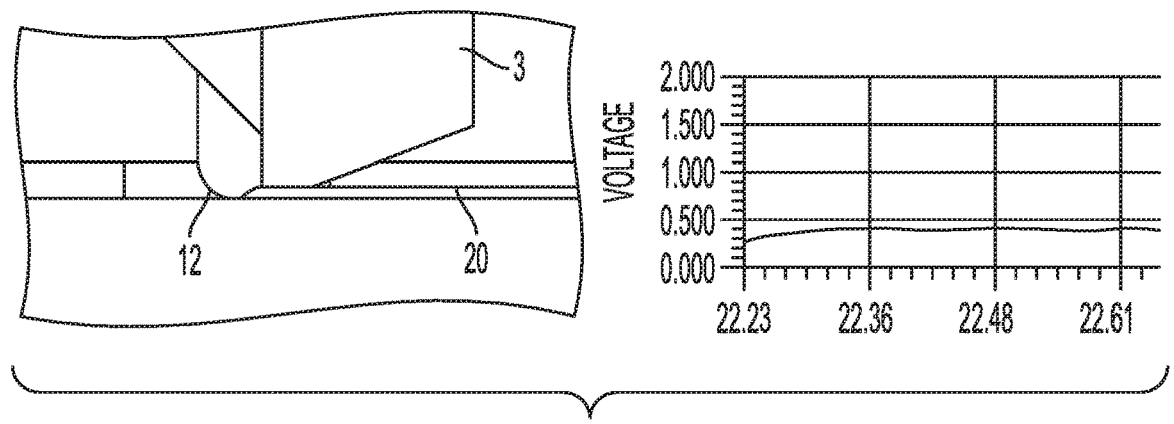

FIGS. 8A through 8C are meant to correspond roughly to what is shown in FIGS. 3, 5 and 7, respectively. FIG. 8A shows the powder wave or front at a beginning point of the spread, substantially blocking the beam 16. The resulting signal is shown in the accompanying graph, with distance on the x axis and voltage on the y axis.

In FIG. 8B, the powder layer has now advanced to the point where some of the beam 16 is no longer being blocked, or conversely, more of the beam is being detected, since the powder height has decreased as powder is being applied to make the layer 20 behind the recoater arm 3. The graph of 8B illustrates the increase in signal strength. FIG. 8C then shows the completion of the layer 20, with little to no blockage of the beam 16, as the powder has now been utilized in layer building. Note that the beam 16 detection is a relative quantification and based upon a correlation established for the process. It thereby need not be a complete blockage at the beginning, nor a complete beam area detected at the end.

Figure 9:
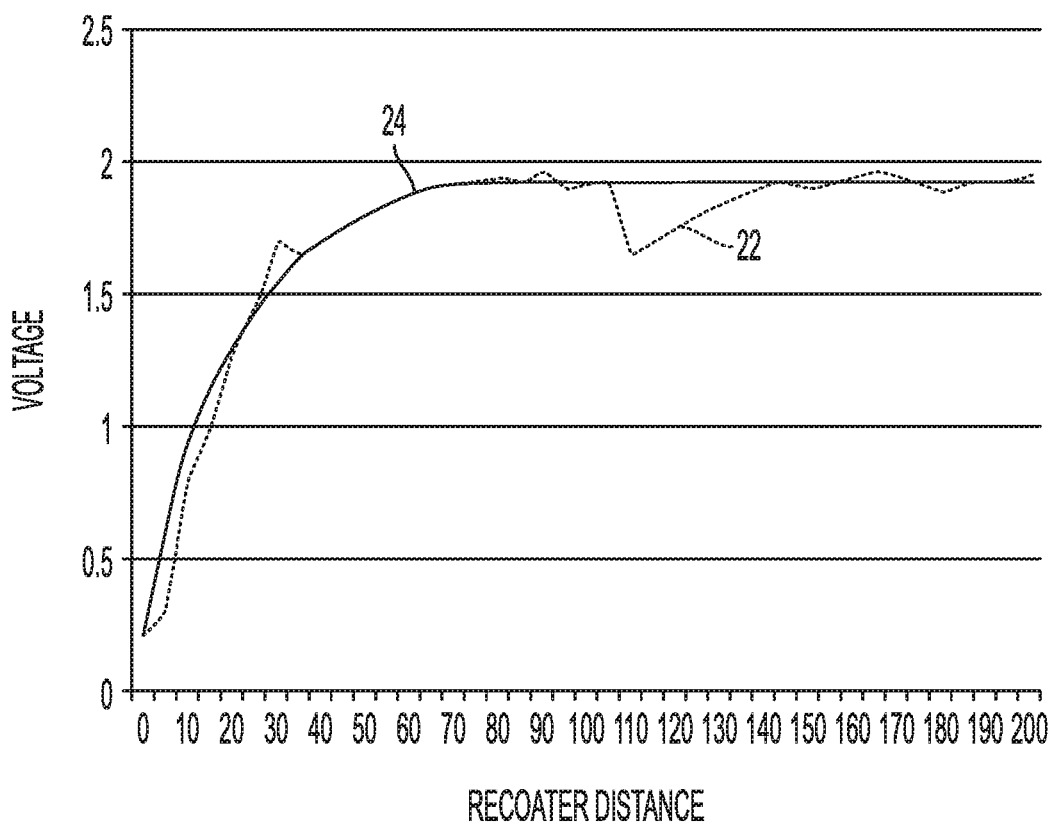
FIG. 9 is an illustrative graph of layer spreadability that could be measured by a sensor array of the present invention in the course of application of a layer, contrasted against a putative desired layer curve.

FIG. 9 illustrates what could be considered as an illustrative actual powder application curve 22, versus a desired theoretical curve 24. In practice of an additive manufacture process as described herein, and to which the invention has most utility, it is considered important to be able to see or determine how the powder is spreading, i.e., its spreadability. The sensor array of the invention provides an understanding of how the powder spreads by measuring the change in the optical signal obtained from the array setup. The slope of this change in the optical signal characterizes how a particular powder feedstock spreads as a layer of intended thickness, which is a characteristic of and correlates to final part quality. This data is useful in formulating a scanning strategy for generation of the object 2, as well as for quality assessment. Each powder material type has its own unique characteristic, i.e. slope/curve. If there is a large particle or clump of particles or a void of powder, then it could be said the powder is not flowing optimally and evenly. A clump appears as a drop in the curve 22; a void appears as a spike in the curve.

Figure 10:
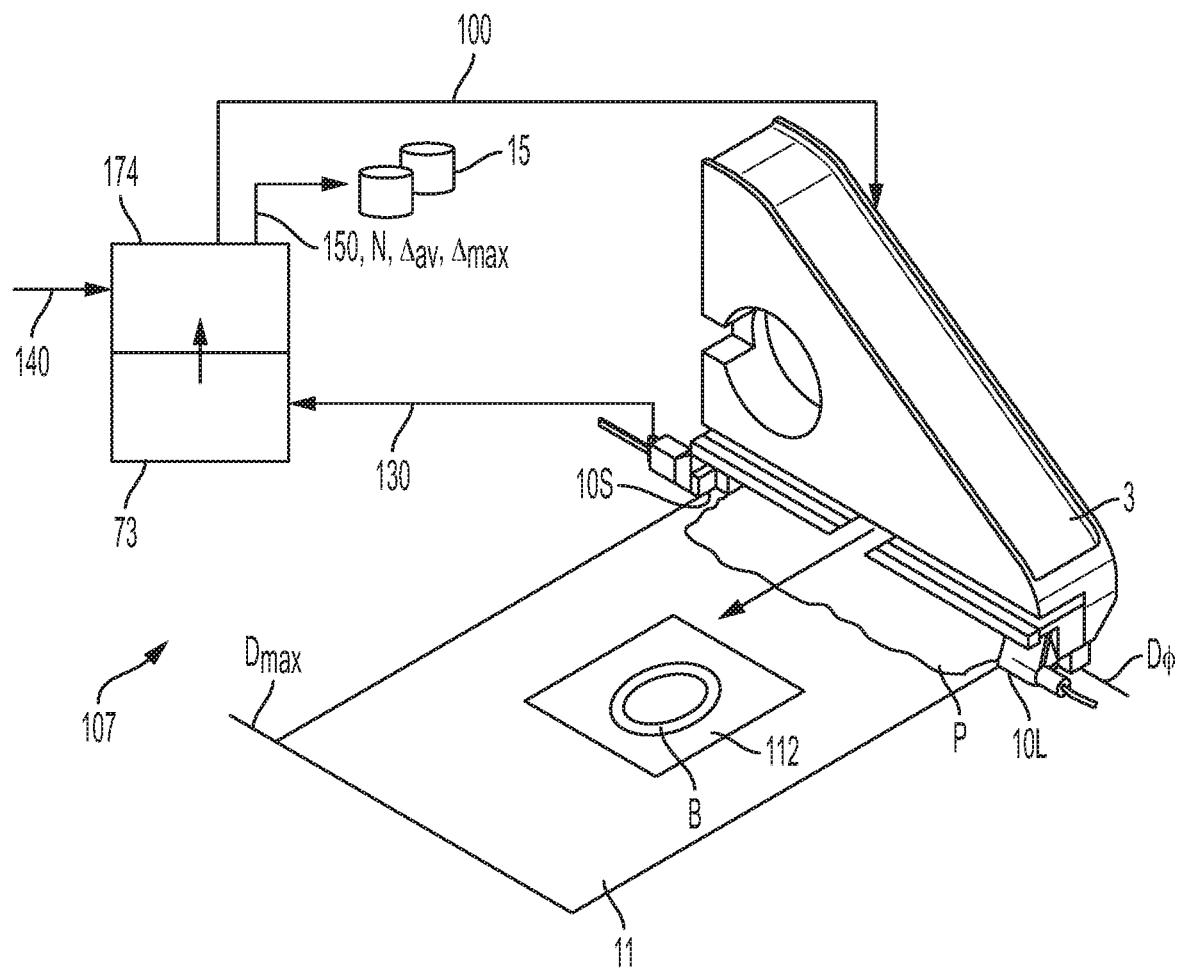
FIG. 10 shows a simplified schematic diagram of part of an embodiment of the inventive additive manufacturing apparatus.

FIG. 10 shows a simplified schematic diagram of part of an additive manufacturing apparatus 101 according to one aspect of the invention. A recoating assembly or spreader assembly supports a spreader 3 with a straight edge arranged at a small distance above a table 11 or build area 11 to set the layer thickness of the powder layer. The diagram shows that the spreader 3 will push a powder pile P across table 11 in the direction indicated by the large arrow during each pass of an additive manufacturing process. Generally, the volume of the powder pile P has been determined in advance to be sufficient to form a thin layer that extends beyond a build platform 112, and may be enough to extend over the entire surface 11 or table 11. These components of the additive manufacturing apparatus 1 are generally contained in a chamber (not shown).

In an initial step, the additive manufacturing apparatus 101 is prepared for a build B by loading a set of build instructions 140 into a controller 114. The build instructions 140 may include information or data relating to physical properties of the powder such as its flowability, etc. A build B (a cylindrical object in this case, indicated by its annular uppermost surface) is supported on the build platform 112. During a build procedure, the controller 114 causes the spreader 3 to move across the table 11, thereby pushing the powder mound P in the direction shown, and distributing a thin layer of powder over the table 11, including the build platform 112 and the partial build B, during each pass of the spreader 3. Once the spreader 3 has distributed a layer of powder, the controller 114 may send it from the final position $D_{max}$ back to its initial position $D_o$, and then actuates a laser beam (not shown) to fuse specific regions of the powder layer, thereby hardening the material in the build area. The controller 114 then causes the build platform 112 to be lowered by an amount corresponding to the build layer thickness, ready for the next pass of the spreader 3.

In this exemplary embodiment of the additive manufacturing apparatus 101, the spreader assembly is equipped with an optical sensor 10S and a light source 10L. These elements 10S, 10L are arranged at either end of the spreader 3 and therefore also at either end of the power pile P. The light source 10L and the optical sensor 10L are in line with each other and face each other, so that the direction of the light beam emitted by the light source 10L is essentially perpendicular to the surface of the optical sensor 10S. To carry out the inventive method, the light source 10L is activated to cast a shadow of the powder mound P onto an optical sensor 10S while the spreader 3 pushes the powder mound P across the surface 11. At the start of a pass, the powder pile P may completely block the light beam. As the spreader 3 moves across the table 11, the volume of the power pile P diminishes, and opens up the path between optical sensor 10S and light source 10L. As more and more light reaches the optical sensor 10S, its output voltage increases. The optical sensor output 130 is sent to an analysis unit 113.

In this exemplary embodiment, the analysis unit 113 of the additive manufacturing apparatus 1 records the voltage output 130 by the optical sensor 10S for each pass of the spreader 10. The voltage 130 can be recorded over time and/or over spreader position (distance of the spreader 10 from its initial position). For each pass of the spreader 10, a voltage curve can be obtained. Using a suitable algorithm, the smoothness of the voltage curve can be determined, for example by computing the slope of the voltage curve at a multitude of points along the curve. The smoothness or lack of smoothness of the voltage curve can be used to quantify the spreadability of the powder as explained above, and the spreadability of the powder can be expressed as a set of values 150 that may comprise a slope change count N (i.e. the number of times the slope of the sensor output changes sign), an average discrepancy Aav (between expected and measured sensor output values), an absolute maximum discrepancy $A_{max}$ (between expected and measured sensor output values), etc.

Figure 11:
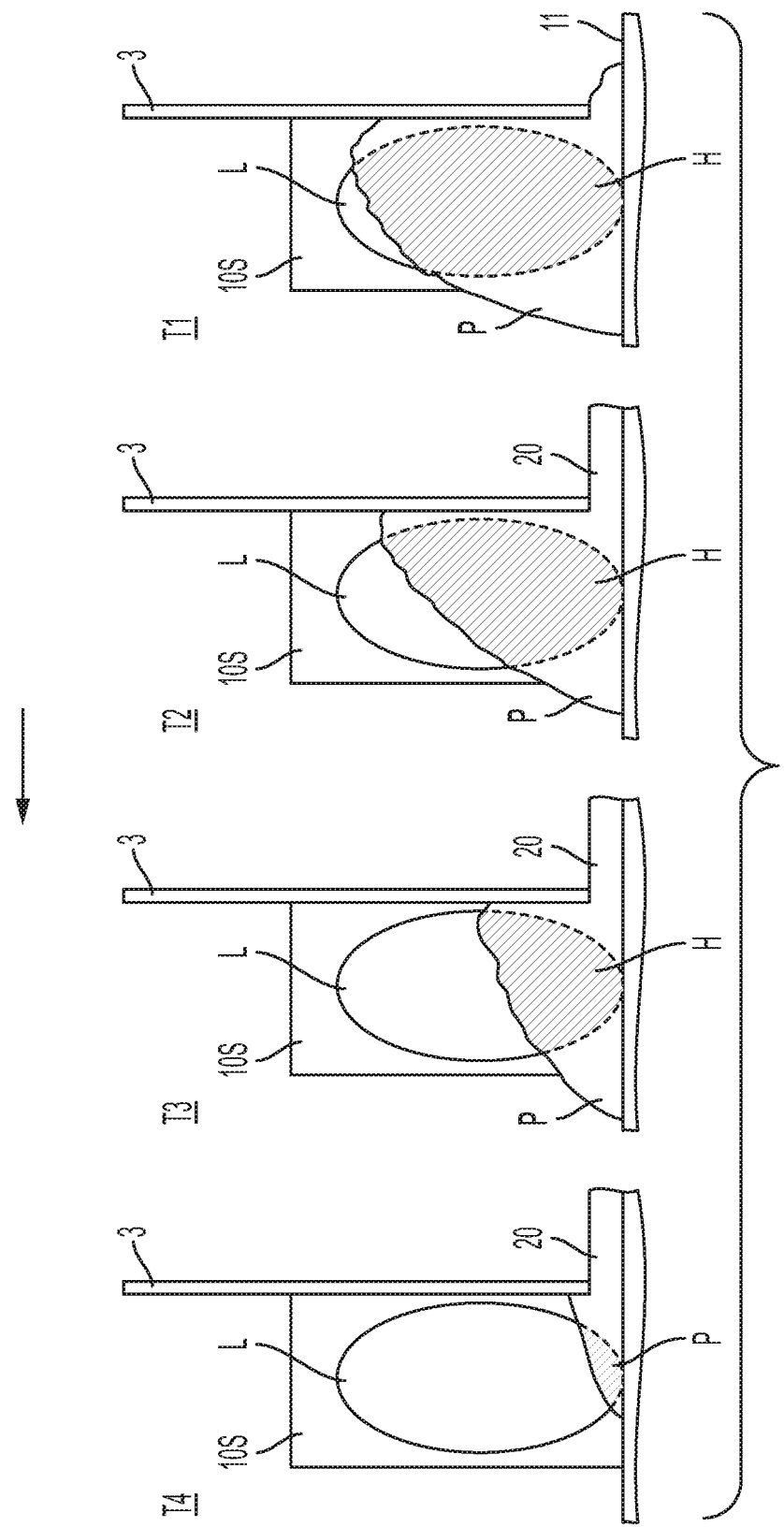
FIG. 11 shows four time instants during one pass of the spreader of the additive manufacturing apparatus of FIG. 10.
Figure 12:
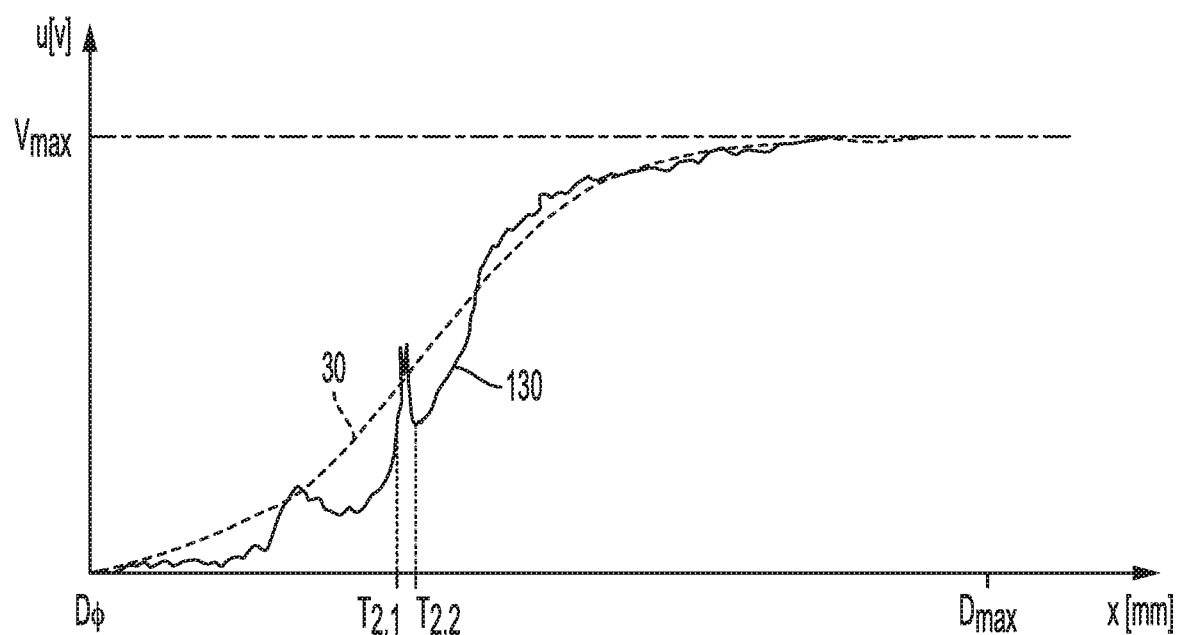
FIG. 12 shows an exemplary voltage curve for the sequence explained in FIG. 11.
Figure 13:
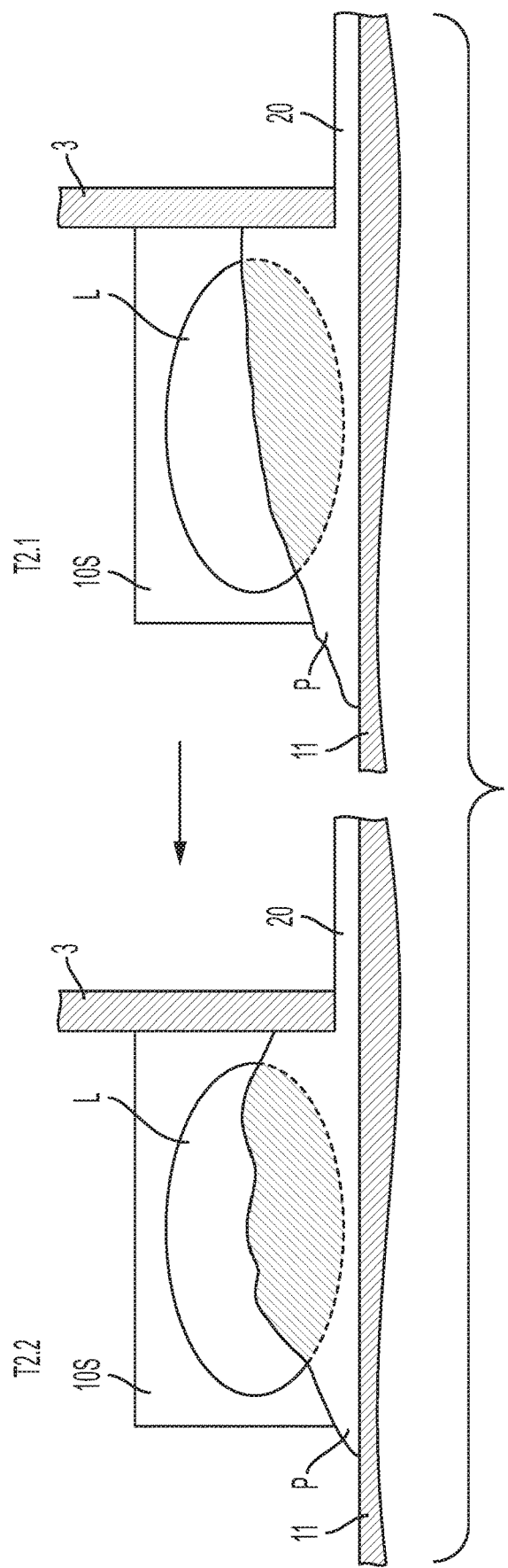
FIG. 13 shows two consecutive time instants during a pass of the spreader of the additive manufacturing apparatus of FIG. 10.

FIGS. 11-13 illustrate an underlying concept of the invention. In FIG. 11 four time instants during one pass of the spreader 3 (moving from right to left in the drawing) are shown. The first instant T1 corresponds to the start of the pass, and the powder pile P is essentially "complete" since the spreader 3 has not yet moved. At this point in time, the shadow H cast by the light source covers most or all of the optical sensor 10S. The circular shape on the optical sensor 10S indicates the illuminated area that would be seen if there was nothing in the path of the light from the light source 10L.

At the second instant T2, the spreader 3 has moved from its initial position and some of the powder has been spread in a layer 20 on the table 11, so that the powder pile P is somewhat reduced. At this point in time, the shadow H of the powder pile P is smaller, so that more light L lands on the optical sensor 10S.

At the third instant T3, the spreader 3 has moved further, and more powder has been spread on the table 11, so that the powder pile P is significantly reduced. The shadow H of the powder pile P is now quite small, and the illuminated area is larger. At the fourth instant T4, the spreader 3 has moved to its final position, and the powder pile P is essentially depleted, so that most or all of the optical sensor 10S is revealed.

FIG. 12 shows an exemplary voltage curve for the sequence explained in FIG. 11. Under ideal conditions in which a powder spreads optimally, the voltage signal from the optical sensor might follow a smoothly increasing smooth curve 30 indicated by the dotted line. This would be because the powder pile would ideally retain a uniformly smooth curved shape even as it is pushed by the spreader across the table to gradually decrease in volume; and the shadow of the gradually decreasing powder pile would have a uniformly smooth silhouette that gradually becomes smaller, ultimately exposing the sensor completely (corresponding to the maximum sensor output voltage $U_{max}$). If a powder is spreading well, the voltage curve will be smooth, and will be close to the ideal curve 30. If the powder is not spreading well, for whatever reason, the voltage curve 130 will not be smooth and may depart significantly from the ideal curve 30. The invention is based on the insight that the spreading behavior of a powder can be quantified in terms of the smoothness of the voltage curve.

In a real-life additive manufacturing process, the surface of the power pile may be erratic, with irregular heaps and voids developing and disappearing as the spreader moves across the table and the particles in the power pile are agitated. The erratic behavior of the powder particles may arise from non-ideal interactions between the powder particles and also from interactions between the powder particles and the surface of the previous build. These resulting small heaps and depressions in the surface of the powder pile alter the shape of the shadow cast by the powder pile onto the optical sensor. Instead of gradually and steadily decreasing in area, the area covered by the shadow may sometimes actually increase slightly (because of a small heap on the powder pile) and/or may decrease more than expected (because of a depression or dip in the powder pile). As a result, the voltage signal from the optical sensor will not follow a smooth progression, and may instead appear as the curve 130. A "clump" of powder particles on the powder wave will result in a voltage drop in the curve 130 (the shadow is larger), while a "void" or depression in the powder wave will result in a spike in the curve 130 (the shadow is smaller). This is illustrated with the aid of FIG. 13, which shows the shadows cast by the powder pile for two consecutive time instants T2.1 and T2.2. At time instant T2.1, the spreader 3 has moved from its initial position and some of the powder has been spread on the table 11, so that the powder pile P is somewhat reduced. The shadow H of the powder pile P has reduced so that about half of the optical sensor 10S is exposed. At the consecutive time instant T2.1 (for example a subsequent sampling instant), the spreader 3 has moved by a short distance so that the volume of the powder pile P has been reduced accordingly. However, instead of the expected increase in voltage (from an expected increase in exposed sensor area), powder particles have clumped to form smaller heaps on the powder pile, resulting in an actual increase in size of the cast shadow.

Instead of being slightly greater than the previously measured value, the voltage output of the optical sensor is slightly lower, and the slope of the voltage curve will be less than the previously computed slope and may even be negative instead of positive.

The analysis unit 113 of the inventive additive manufacturing apparatus may be realized in any suitable manner, and may comprise various units or modules for processing signals received from the output sensor. For example, it may comprise a data acquisition module, a low-pass filter, etc. The analysis unit 13 may further comprise a suitable module realized to carry out an algorithm that counts the number of times N the slope changes sign and/or the average discrepancy $\Delta_{av}$ between expected voltage and measured voltage and/or the absolute maximum discrepancy $\Delta_{max}$ between expected voltage and measured voltage. The spreadability of a particular powder during a particular build procedure may then be quantified by a feature set or vector comprising a suitable combination of these values.

Figure 14A:
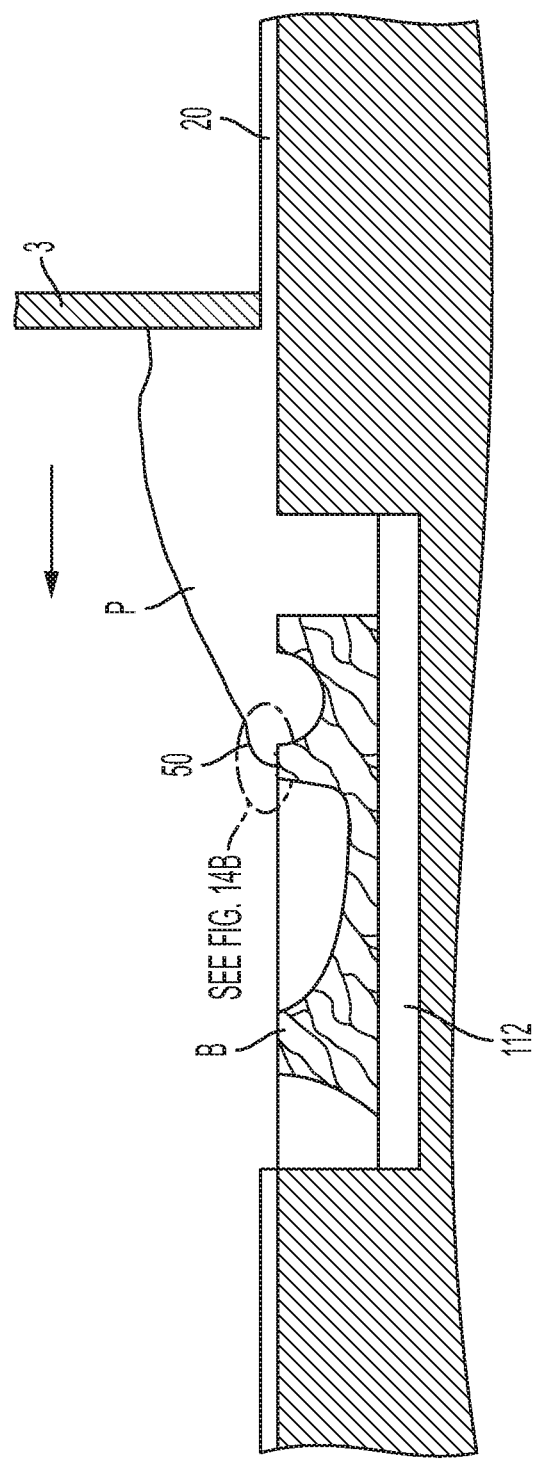
FIG. 14A shows a cross-section through an exemplary partial build.
Figure 14B:
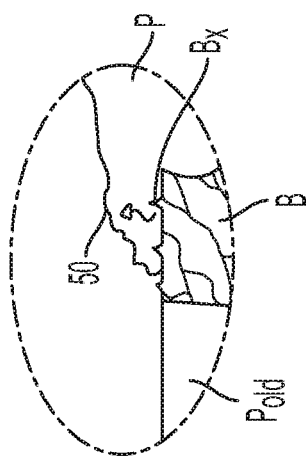
FIG. 14B is an enlarged view of the area labeled "SEE FIG. 14W" shown in FIG. 14A.

As explained above, a problem being remedied by the invention is that of an uneven powder distribution on the table, and more importantly an uneven powder distribution on the surface of the build. This is illustrated in FIG. 14, which shows a cross-section through an exemplary partial build B at a time instant at which the spreader 3 is pushing the powder pile P over the build platform 12. The enlarged portion of the drawing shows an irregular surface in a section of the build B. As explained above, the friction between the powder and the hardened upper build surface will be different than the friction between the powder and the table. Furthermore, the upper build surface may not be ideal, i.e. an essentially flat surface, and may instead be rough and may exhibit irregularities. The irregularities—shown as small spikes Bo or the like—can form for various reasons, for example because of residual stresses from melting and solidification of the build material. As the powder pile P is pushed over the build platform 112 and the build B, the presence of the irregularities $B_x$ can result in incomplete coverage of the build surface leading to cavities in the build B. The incomplete coverage at the surface of the partial build can manifest as bumps and depressions in the contour of the powder heap P. The shadow H of the powder pile P cast on the optical sensor will therefore not be smooth as expected, and this can be detected by analysing the voltage output 130 of the optical sensor 10S as described above. With this information describing the spreading behaviour of this type of powder for this specific build, the controller of the additive manufacturing apparatus 1 can then adjust appropriate operating parameters, for example it may introduce a slight vibration or oscillation in the motion of the spreader 3 as it passes over the build B, so that the powder particles are given the opportunity to correctly settle in a homogenous layer onto the surface of the build B. Other operating parameters may be to adjust the rate of motion of the spreader 3, for example to allow it to push the powder pile P more slowly over the build platform 112. Apart from adjusting operating parameters to suit a powder, the invention makes it possible to identify a powder that would be more suitable for a particular build, i.e. the specification of the powder material itself can be adjusted, rather than the operation of the apparatus itself. In other words, it is possible to select a powder with a satisfactory spreadability, since known properties of a powder such as particle size distribution, particle morphology, moisture content, agglomerates etc. can be related by the inventive method to the spreadability of that powder when used in a certain build procedure. With the inventive method, the additive manufacturing process can be improved to essentially eliminate the development of undesirable features such as cavities or pinholes in the build.

Having set forth an embodiment of the invention herein, those of skill in the art will recognize variations, modifications, substitutions, and the like which will fall within the spirit of the invention, and as intended to be covered by the claims which follow.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An additive manufacturing apparatus comprising:
   a build platform arranged to support a build;
   a table arranged that receives a deposited powder and a spreader that displaces the deposited powder to distribute a powder layer over at least the build platform, the spreader pushing an accumulation of powder in a mound across the table;
   an optical sensor arranged in line with a light source, wherein the light source generates a light beam having a radial cross-section presenting a beam area of beam exposure that encompasses at least some of the mound of powder so as to cast a shadow having a shadow area of the powder mound onto the optical sensor for detection during displacement of the powder mound, wherein the light source and optical sensor are arranged at opposite ends of the spreader; and
   an analysis unit that analyzes an output of the optical sensor to determine the spreading behavior of the powder based upon the shadow area detected.

2. The additive manufacturing apparatus according to claim 1, wherein the light source comprises a laser light source.

3. A sensor for use in additive manufacture apparatus having a build area, wherein a powder material is applied in successive layers using a spreader device extending across and moving along a surface of the build area in operation of the additive manufacture apparatus to deposit and smooth a layer of material, the spreader device pushing an accumulation of powder in a mound across the table, the sensor comprising:
   a source of radiant energy carried on the spreader device and generating, a light beam having a radial cross-section presenting a beam area of beam exposure that encompasses at least some of the mound of powder so as to cast a shadow having a shadow area;
   a detector carried on the spreader device and spaced from and arranged to receive the energy beam, wherein the detector is spaced from the beam at a distance to span a width of the layer in an x-y plane and located such that a height of the material in the mound being applied and moved by the spreader device in a z axis orthogonal to the x-y plane will block at least part of the beam, and wherein the detector generates a signal that varies with the amount of beam blockage; and
   an output generating device receiving the signal and providing an output correlated to the spreadability of the layer being applied.

4. The sensor of claim 3, wherein the source of radiant energy is a light source.

5. The sensor of claim 4, wherein the source of radiant energy is a laser.

6. The sensor of claim 3, wherein the spreader is an elongated blade, and wherein the radiant energy source is carried on a bottom end of the blade, and the detector is carried on an opposite end of the blade.

7. An additive manufacture machine using layerwise build-up to create an object, comprising:
- a build area, wherein a powder material is applied in successive layers;
- a source of fluent build material;
- an applicator device that moves across the build area and spreads the material in a first layer and then successive layers, the applicator device pushing an accumulation of powder in a mound across the build area;
- a sensor array carried on the applicator device and generating a beam of radiant energy spanning a width across a layer being applied, wherein the array includes a beam generator and a beam detector, wherein the beam detector is arranged such that a layer being applied will intercept at least a part of the beam,
- the beam having a radial cross-section presenting a beam area of beam exposure that encompasses at least some of the mound of powder so as to cast a shadow having a shadow area of the powder mound onto the beam detector, the beam detector being spaced from the beam at a distance to span a width of the layer,
- the beam detector generating a signal that varies with the amount of beam blockage; and
- an output generating device receiving the signal and providing an output correlated to the spreadability of the layer being applied.

* * * * *